US007761119B2

(12) United States Patent
Patel

(10) Patent No.: US 7,761,119 B2
(45) Date of Patent: Jul. 20, 2010

(54) SIGNAL STRENGTH ANNUNCIATORS FOR MULTI-MODE WIRELESS COMMUNICATION DEVICES

(75) Inventor: Mehul B. Patel, Bangalore (IN)

(73) Assignee: Kyocera Corporation, Kyoto (JP)

( * ) Notice: Subject to any disclaimer, the term of this patent is extended or adjusted under 35 U.S.C. 154(b) by 643 days.

(21) Appl. No.: 11/428,737

(22) Filed: Jul. 5, 2006

(65) Prior Publication Data

US 2008/0009324 A1    Jan. 10, 2008

(51) Int. Cl.
*H04B 1/38* (2006.01)
(52) U.S. Cl. .................. 455/566; 455/423; 455/435.2; 455/134; 455/234.1; 455/422.1; 455/101; 455/277.2; 455/236.1; 455/115.3; 455/226.2; 455/115; 455/513; 370/328; 370/331
(58) Field of Classification Search ............. 455/134, 455/234.1, 101, 277.2, 236.1, 422.1, 115.3, 455/226.4, 67.7, 157, 115.4, 334, 226.2, 455/450, 226.3; 715/700, 762, 764; 370/331, 370/328, 329, 538, 498, 522, 537; 709/233
See application file for complete search history.

(56) References Cited

U.S. PATENT DOCUMENTS

| | | | | |
|---|---|---|---|---|
| 6,035,183 | A * | 3/2000 | Todd et al. | 455/226.2 |
| 6,393,307 | B1 * | 5/2002 | Kim | 455/566 |
| 7,245,913 | B1 * | 7/2007 | Nguyen et al. | 455/435.2 |
| 7,450,958 | B2 * | 11/2008 | Shim et al. | 455/513 |
| 2003/0181180 | A1 * | 9/2003 | Darabi et al. | 455/234.1 |
| 2004/0102167 | A1 * | 5/2004 | Shim et al. | 455/226.2 |
| 2004/0192290 | A1 | 9/2004 | Muthuswamy et al. | |
| 2004/0243307 | A1 * | 12/2004 | Geelen | 701/213 |
| 2005/0130661 | A1 | 6/2005 | Aerrabotu et al. | |
| 2005/0152304 | A1 * | 7/2005 | Park | 370/328 |
| 2005/0182847 | A1 * | 8/2005 | Jawad Pirzada et al. | 709/233 |
| 2006/0009220 | A1 * | 1/2006 | Kiyomoto et al. | 455/435.2 |
| 2006/0092880 | A1 * | 5/2006 | Nounin et al. | 370/331 |
| 2006/0116092 | A1 * | 6/2006 | Uno et al. | 455/134 |
| 2006/0121894 | A1 * | 6/2006 | Ganesan | 455/432.1 |
| 2006/0205371 | A1 * | 9/2006 | Kitani et al. | 455/226.2 |
| 2007/0010241 | A1 * | 1/2007 | Wachter et al. | 455/423 |
| 2007/0016861 | A1 * | 1/2007 | Salomaa et al. | 715/700 |
| 2007/0021126 | A1 * | 1/2007 | Nanda et al. | 455/456.1 |

* cited by examiner

*Primary Examiner*—Rafael Pérez-Gutiérrez
*Assistant Examiner*—Joseph Arevalo

(57) ABSTRACT

A system and method for indicating signal strength of a multi-mode wireless communication device is disclosed. The wireless communications device simultaneously displays signal strength indicators of multiple radio access technologies on the multi-mode wireless communication device. In an exemplary method, the multi-mode wireless device determines a first signal strength of a first radio access technology and displays the signal strength in a designated annunciator area of a display of the device. The device then determines availability and signal strength for a second radio access technology and further displays a second signal strength indicator in the annunciator area corresponding to the second determined signal strength of the second radio access technology.

15 Claims, 6 Drawing Sheets

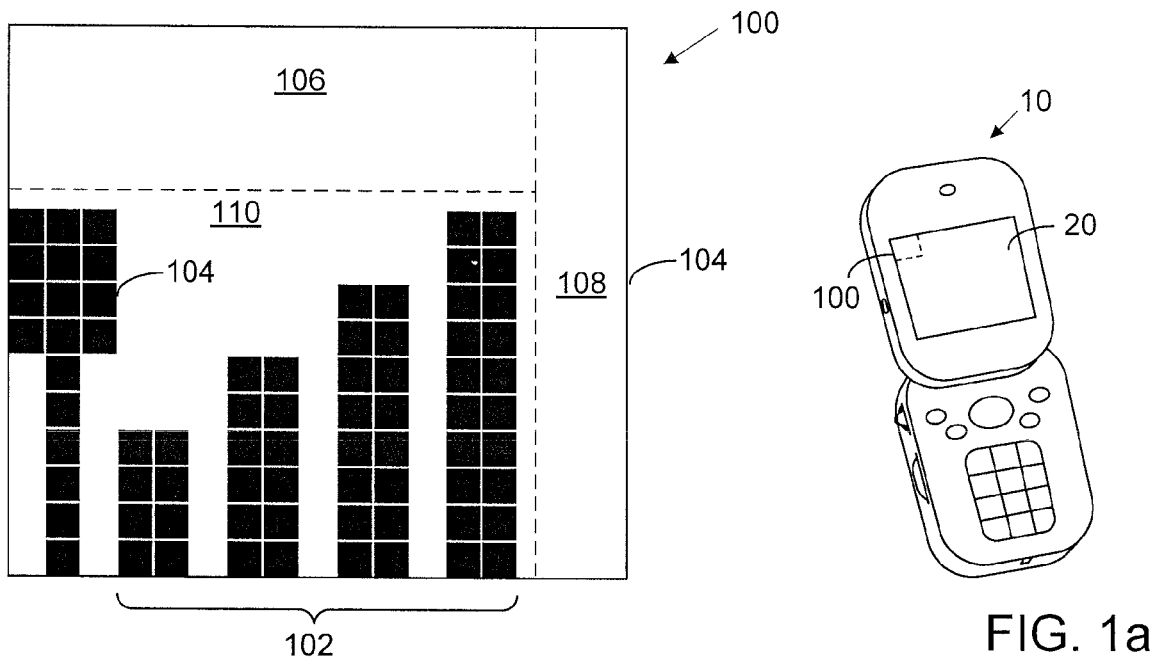
FIG. 1b
FIG. 1a
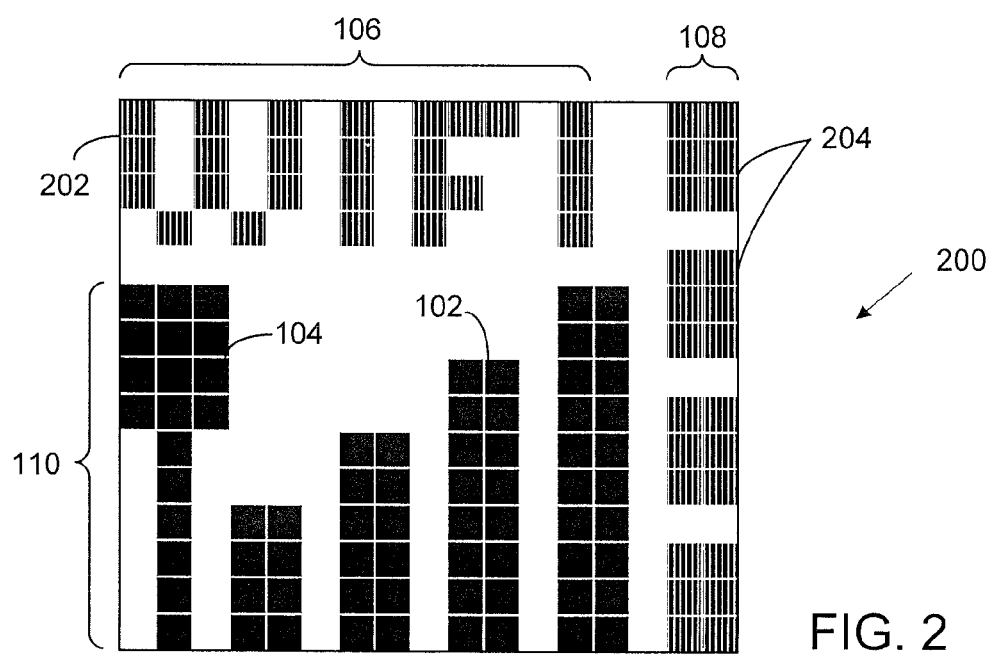
FIG. 2

SIGNAL STRENGTH ANNUNCIATORS FOR MULTI-MODE WIRELESS COMMUNICATION DEVICES

FIELD OF THE INVENTION

The present invention relates to the field of user interface indicators for wireless communication devices. More specifically, the invention relates to display of multiple signal strengths in the annunciator area of a user interface of a wireless communication device.

BACKGROUND

Multi-mode handsets offer the capability for a wireless communication device to communicate with a variety of network types, including wireless local area networks (WLANs), code division multiple access (CDMA), advanced mobile phone service (AMPS), global system for mobile communications (GSM), time division multiple access (TDMA), Typically, a multi-mode wireless communications device indicates the signal strength of the antenna of the service that the device is currently using. The current signal strength in most devices is indicated by a series of bars of graduated height, that is, signal strength display bars or signal strength indicators/indications. For example, if the phone is using code division multiple access (CDMA) services, then the signal strength display indicates the strength of the CDMA signal. If the phone is using a wireless local area network, such as a wireless fidelity (WiFi) network, then the signal strength display indicates the strength of the WiFi signal. In such a device, a user must attempt to switch from a first network to a second network to determine the availability and signal strength of the second network.

In addition to the signal strength indication, some multi-mode devices may identify different networks by unique icons while still maintaining the signal strength bar indicator in a display. The use of unique icons is useful when a device is roaming outside of a home network so that a user can quickly determine the type of network currently being accessed. Other devices may include signal strength bars for a receive signal and signal strength bars for a transmit signal. However, these solutions do not alert a user of the presence of an accessible alternate network.

The user may wish to switch to an alternate network type if the signal strength is sufficient. However, the user does not know whether the device is in range of, for example, a WLAN unless he or she initiates the search, particularly when the signal strength of the current system is sufficient, and the network has not directed a search for a new network. Accordingly, there remains a strong need in the art for a method and apparatus for simultaneously displaying signal strength in multi-mode wireless communications devices.

SUMMARY OF THE INVENTION

In an exemplary embodiment, a wireless communications device determines the strength of a first currently-used network, and displays the signal strength on a display in an annunciator area, also referred to herein as a signal strength display area, using a unique first signal strength indication. The device then determines the strength of a second available network, and simultaneously displays the signal strength of the second network on the display using a unique second signal strength indication. In another exemplary embodiment, the device determines the signal strength for all, or a subset, of available networks. Signal strengths of available networks are displayed according to any pre-determined criteria within a signal strength display area. The signal strength display area provides a device user with a quick reference list of all available systems.

BRIEF DESCRIPTION OF THE DRAWINGS

Other features and advantages of the present invention will become more readily apparent to those of ordinary skill in the art after reviewing the following detailed description and accompanying drawings.

FIG. 1a illustrates a wireless communication device having a display with a signal strength display area according to one embodiment of the invention.

FIG. 1b illustrates a signal strength display area for displaying a first mode signal strength of a dual mode wireless communications device according to one embodiment of the invention.

FIG. 2 illustrates a signal strength display area displaying a first mode at a full signal strength and a second mode at a full signal strength of two corresponding available networks according to one embodiment of the invention.

DETAILED DESCRIPTION

Figure 3:
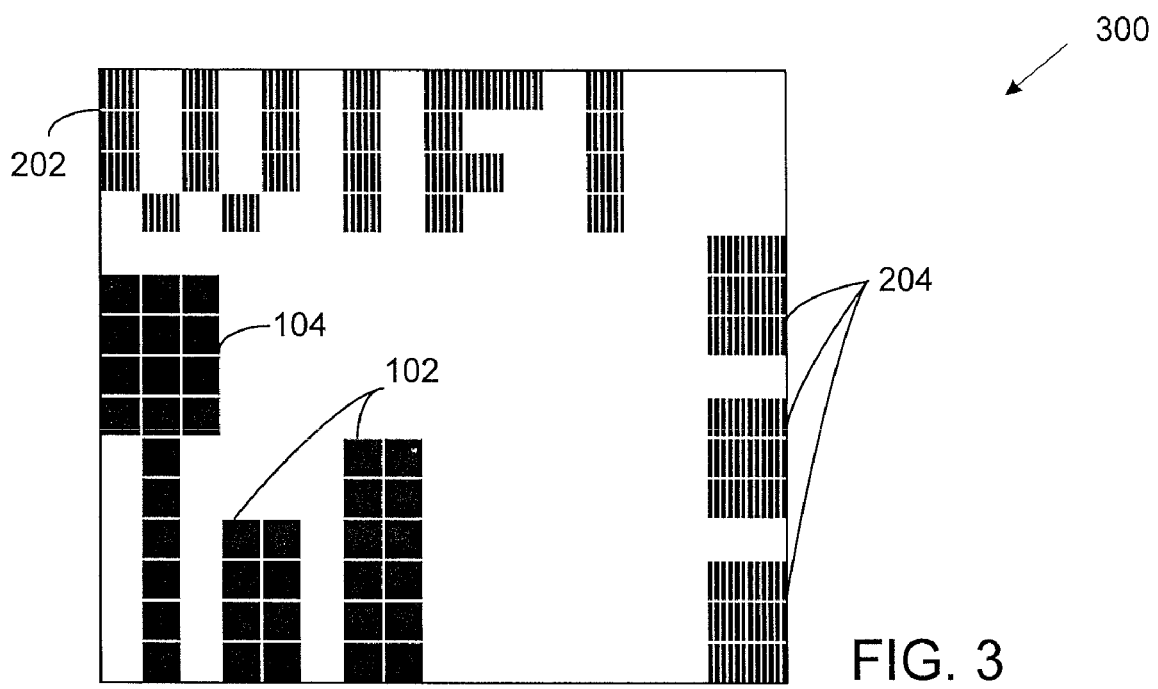
FIG. 3 illustrates another embodiment of the device of FIG. 2 when the signal strengths of the first and second mode are less than full strength.

FIG. 1a is an illustration of a typical wireless communications device 10 having a display 20. Display 20 has an annunciator area 100, also referred to herein as a signal strength display area 100. Signal strength display area 100 may vary in size and in location within display 20, and is shown in the upper left corner of display 20 for illustrative purposes, only. Referring to FIG. 1b, an enlarged representation of signal strength display area 100 of wireless communication device 10 is shown which provides simultaneously displaying of a signal strength for a first network as well as a signal strength for an available, but not currently used, second network.

As shown in FIG. 1b, annunciator area 100 includes a first signal strength indication area 110 and a second signal identification (ID) area 106 and a second signal strength area 108. First signal strength area 110 includes a first network accessed indicator 104 and signal strength bars 102 for the first network that is currently being accessed by the wireless communications device 10. In the illustrated exemplary embodiment, maximum signal strength of the currently accessed network 104 is shown by four graduated-height bars 102. In other embodiments, the number of strength bars used to show maximal signal strength may differ from the illustrated embodiment. In the exemplary embodiment of FIG. 1, second signal ID area 106 and second signal strength area 108 are blank which may indicate that a second network has not been identified, or that a second network is not available for use by wireless communications device 10.

FIG. 2 illustrates an exemplary embodiment of signal strength display area 200 when a first network has maximum signal strength, and a second network is available at a maximal strength. Second signal ID area 106 includes an identification nomenclature for an available second network 202. Second signal strength area 108 displays signal strength bars 204 of available second network 202. FIG. 2 illustrates annunciator area 200 during a given time period in which signal strength of currently used network 104 is maximal as indicated by signal strength bars 102. In this embodiment, the currently used network 104 is a CDMA network. The second available network is a WiFi network 202 as indicated in second signal ID area 106 by the nomenclature "WIFI". Other embodiments may utilize other unique visual indicators or nomenclatures to identify a network type.

Signal strength area 108 for WiFi network 202 illustrates a maximal signal strength as indicated by the four signal strength bars 204. In the exemplary embodiment of FIG. 2, the strength of the signal of available second network 202 is indicated by a multiplicity of same size bars 204. A minimal signal is shown by a single bar 204 and a maximal signal is shown by four bars 204. Other embodiments may utilize various minimum bars and maximum bars or an alternative indication to show signal strength.

In an exemplary embodiment, signal strength display area 110 is illustrated as having an area of 15×17 pixels, however, as mentioned above, other embodiments may utilize annunciator areas of various sizes for displaying signal strengths of a currently accessed network and available networks. In an exemplary embodiment of the invention, the wireless device periodically determines whether a second network is available, and displays available second network ID 202 and second signal strength bars 204 of the second network in the second signal ID area 106 and second signal strength area 108, respectively. In other embodiments, the user may select an option to display the signal strength of the currently used network, only.

The frequency that wireless communications device 10 searches for alternate available networks may be pre-programmed or may be chosen by the device user. Frequent searches for available systems will drain battery power. However, infrequent searches may result in the device 10 not identifying a desired network, particularly if the desired network is a wireless local area network with a limited coverage area.

FIG. 3 illustrates another embodiment of the device of FIG. 2 when signal strengths of first and second mode 104, 202 are less than full strength. The signal strength of first network 104 is below a maximum as indicated by two signal strength bars 102. Similarly, signal strength bars 204 of WiFi network 202 are shown reduced from the possible maximum number. Signal strength of currently accessed network 104 and available WiFi network 202 may decrease due to various reasons including movement of the wireless communications device to another location.

Figure 4:
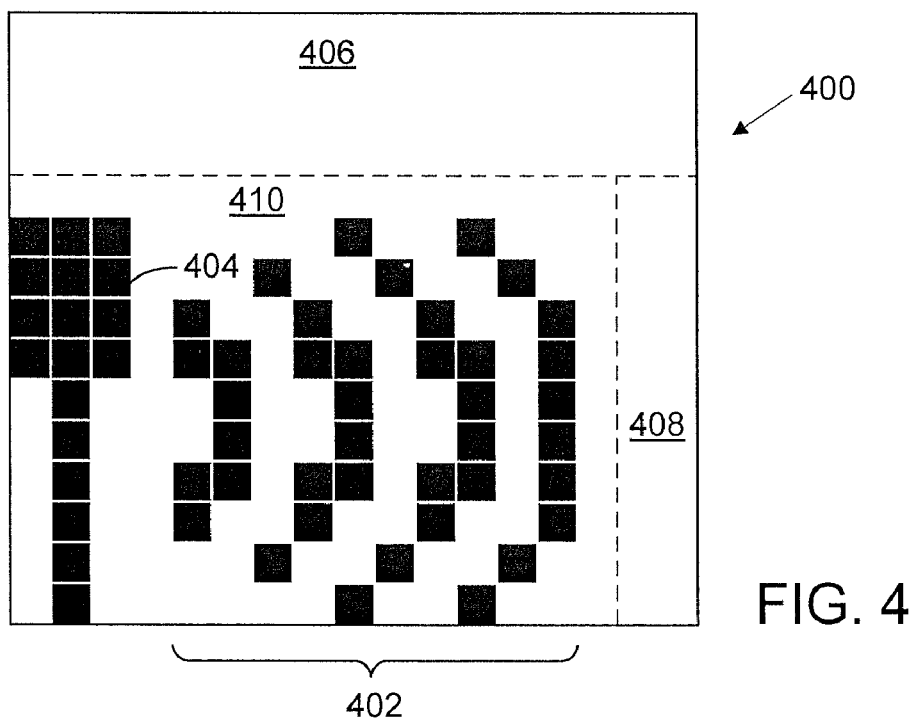
FIG. 4 illustrates a signal strength display area for displaying a second mode signal strength of a dual mode wireless communications device according to one embodiment of the invention.

FIG. 4 illustrates a signal strength display area 400 for displaying a second mode signal strength of a dual mode wireless communications device according to one embodiment of the invention. Signal strength display area 400 includes a second signal strength area 410, a first signal ID area 306 and a first signal strength area 408. In the illustrated embodiment, second network indicator 404 and second network signal strength bars 402 are displayed within second signal strength area 410. Second network signal strength bars 402 are distinct from first network signal strength bars 102, as shown in FIG. 1. This facilitates identification of the network type that is in use. In one embodiment of the invention, as shown in FIG. 4, access to a network is indicated by indicator 104, 404 that does not vary for different network types. In other embodiments, access indicator 104, 404 may be distinguishable to further facilitate identification of the currently accessed network type.

Continuing with FIG. 4, second network signal strength bars 402 are curved. In an example embodiment, curved signal strength bars 402 indicate the signal strength of a WIFI network. In other embodiments, curved signal strength bars 402 may indicate another network type. A greater number of curved signal strength bars 402 indicates a stronger signal strength of second network 404. In the embodiment shown in FIG. 4, the signal strength is maximal. In addition, an alternate network has not been identified as indicated by the unpopulated alternate network ID area 406 and the alternate system signal strength area 408.

Figure 5:
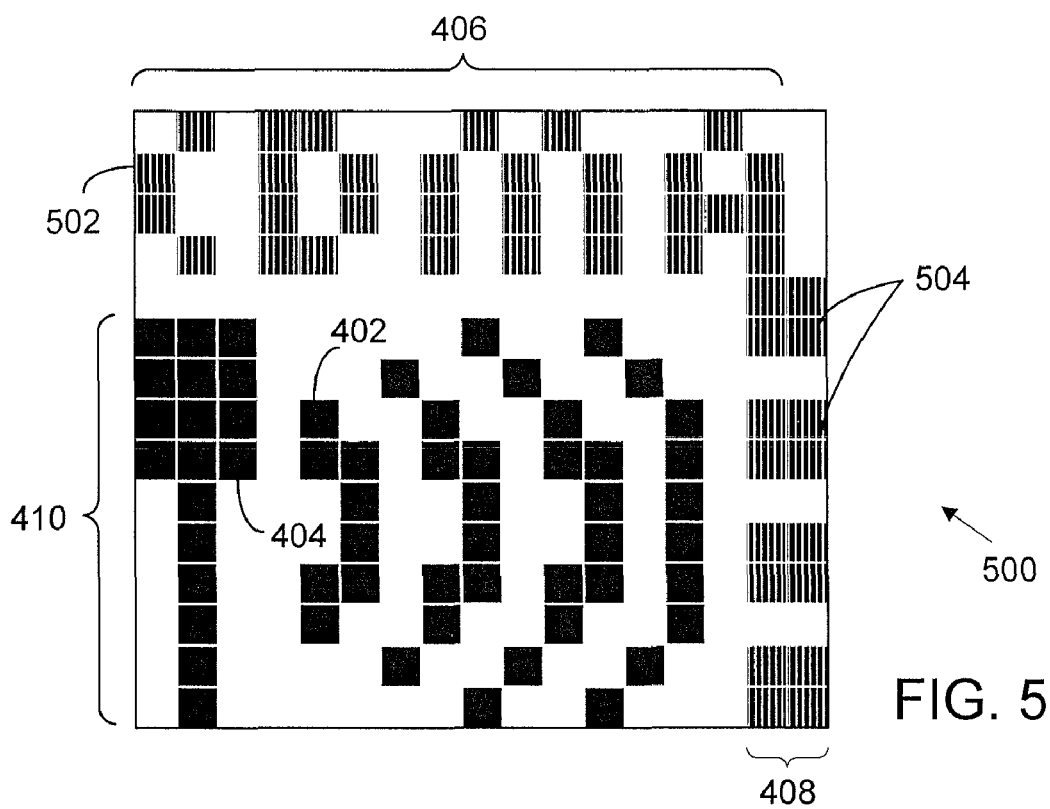
FIG. 5 illustrates a signal strength display area displaying a second mode at a full signal strength and a first mode at a full signal strength of two corresponding available networks according to one embodiment of the invention.
Figure 6:
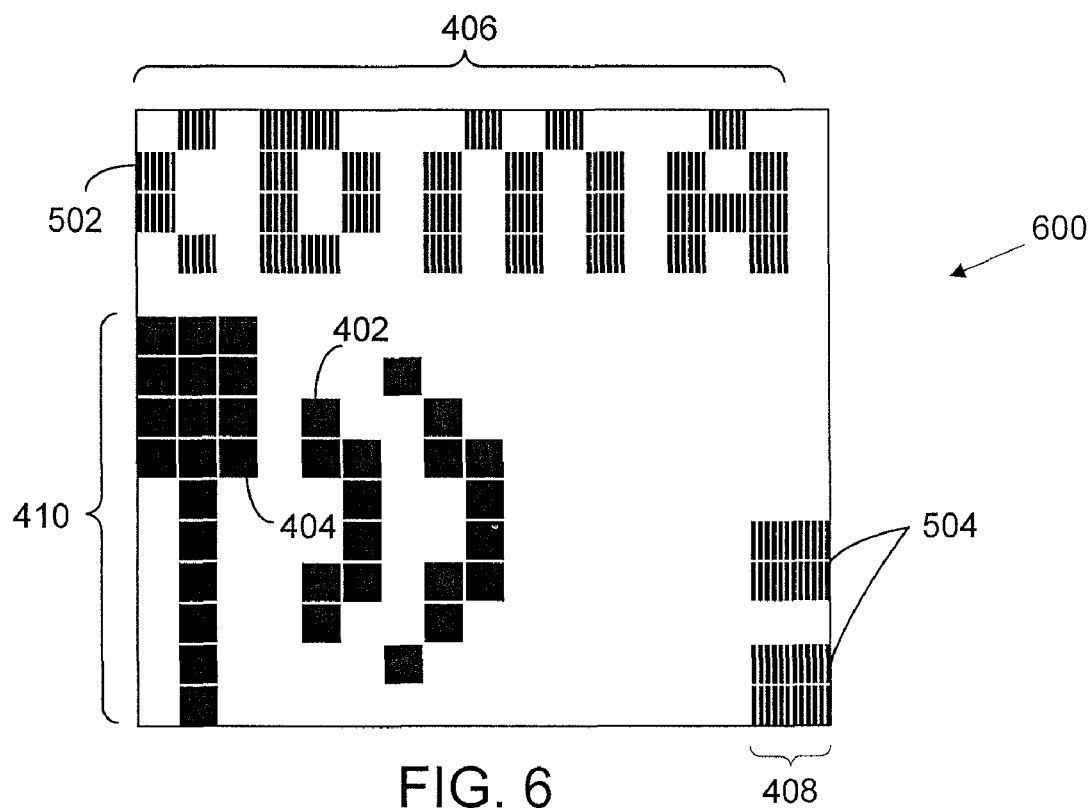
FIG. 6 illustrates another embodiment of the device of FIG. 5 when the signal strengths of the first and second mode are less than full strength.

FIG. 5 illustrates a signal strength display area 500 displaying two available networks according to one embodiment of the invention. Second mode 404 is at a full signal strength as indicated by second mode signal strength bars 402 in the second mode signal strength area 410. First mode 502 is at a full signal strength as shown by the first mode signal strength bars 504 in first signal strength are 408. In the illustrated embodiment of FIG. 5, first mode 502 is CDMA as shown in ID area 406, and second mode 404 is WIFI or another network type. FIG. 6 illustrates another embodiment of the device of FIG. 5 when signal strengths are less than full strength, as shown in signal strength areas 408 and 410 of the first and second mode, respectively.

The embodiments discussed above of a first and second network type, are shown for illustrative purposes, only. That is, any type of network may be identified and indicated in the annunciator areas 100, 200, 300, 400, 500, 600. In addition, the number of indicated networks is limited only by the space provided for annunciator areas. As wireless technology expands, multiple networks may be available for use, and a versatile annunciator area will facilitate a user's choice of all of the available networks.

Figure 7:
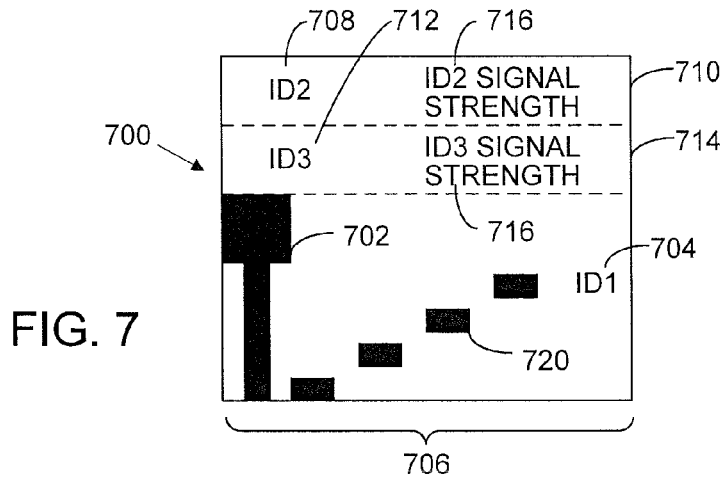
FIG. 7 illustrates an exemplary annunciator area for displaying multiple signal strengths according to an embodiment of the invention.

FIG. 7 illustrates an exemplary annunciator area 700 for displaying multiple signal strengths according to another embodiment of the invention. As illustrated, annunciator area 700 may include multiple indicator areas 704, 714, and 710. Multiple indicator areas 704, 714 and 710 may provide network type identifications ID1 704, ID2 708 and ID3 712 in addition to signal strength indication 706, 716, 718. Signal strength indication may use a signal strength bar indication, or text may be used to indicate the strength of the identified signals 704, 708, 712. The currently used network 702, is indicated by an easily identifiable symbol. As mentioned above, any of a variety of signal strength bars 720 may be used to indicate signal strength.

Figure 8:
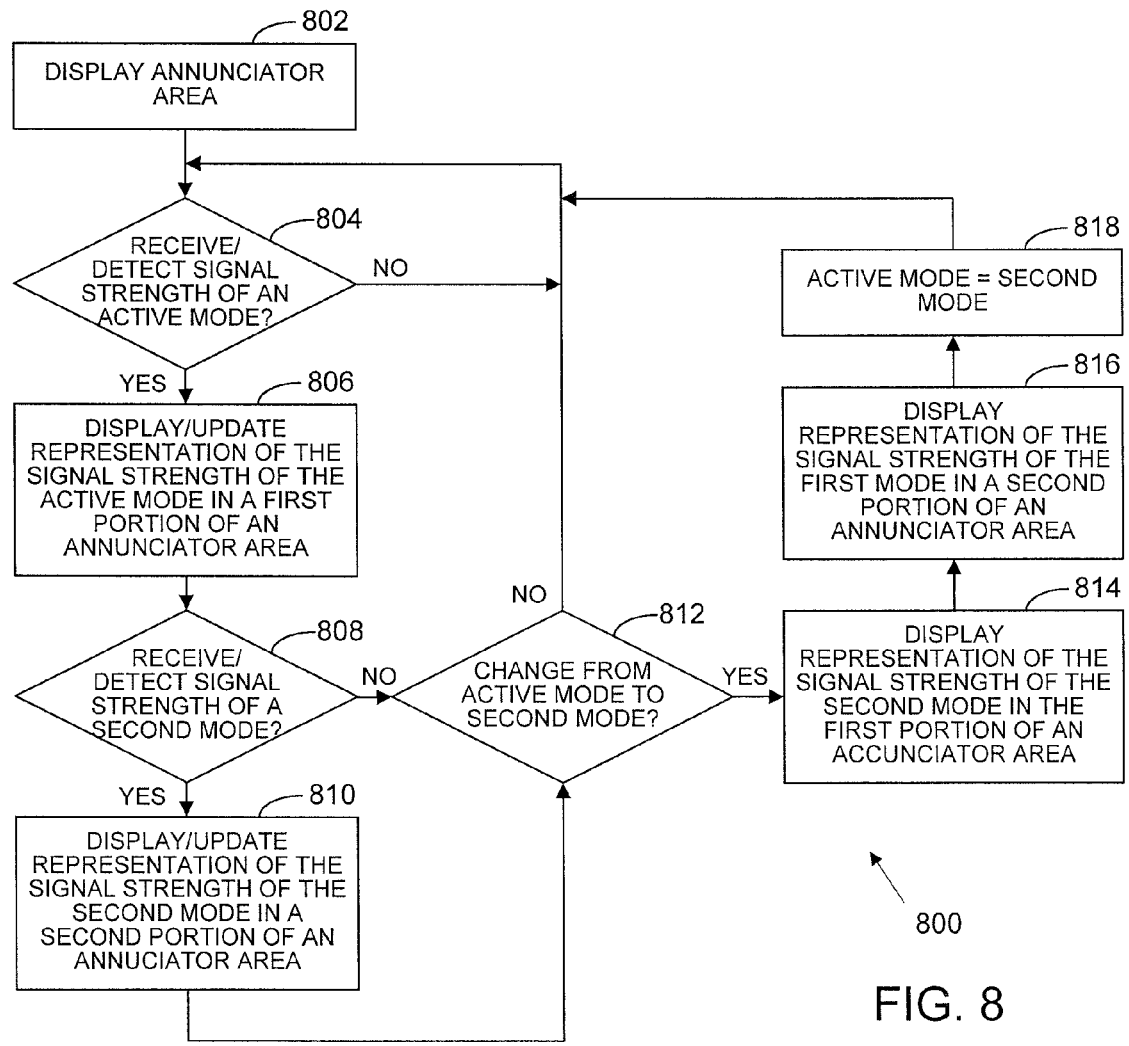
FIG. 8 illustrates a flow chart for a method of displaying signal strengths in a dual mode wireless communications device according to one embodiment of the invention.

FIG. 8 illustrates an exemplary method for displaying signal strength of a multi-mode wireless communications device according to one embodiment of the invention. Certain details and features have been left out of flow chart 800 of FIG. 8 that are apparent to a person of ordinary skill in the art. For example, a step may consist of one or more sub-steps or may involve specialized equipment or materials, as known in the art. While steps 802 through 818 shown in flow chart 800 are sufficient to describe one embodiment of the present invention, other embodiments of the invention may utilize steps different from those shown in flow chart 800.

In block 802 the annunciator area is displayed 802. The annunciator area displays an indication that the phone is active in a first network. In block 804, the multi-mode wireless device determines the signal strength of the first network. Upon determination of a signal strength, a representation of the received signal strength is displayed in a first portion of the annunciator area in step 806. As discussed above, in one particular embodiment of the invention, the first portion of the annunciator area is reserved for display of the signal strength of the active network.

In decision block 808, the multi-mode wireless device then searches for an alternate network, such as a wireless local area network, that may overlap with the currently active network. The search may be automatic and initiated periodically. In other embodiments, the search may be user defined or user initiated. If a second network is detected, as shown in block 810, then a representation of the signal strength is displayed in a second portion of the annunciator area. In one embodiment, the type of network is also indicated in the second portion of the annunciator area using a unique text description or a symbol or icon, for example. In decision block 812, the multi-mode wireless device determines whether the wireless device has been switched from the current mode to the detected second mode. If the mode has switched, then the second mode is displayed in the active first portion of the annunciator area, as shown in block 814, and the previous active mode is displayed in the second annunciator area, assuming that a signal is still available for the previous active mode, as shown in block 816. The second mode becomes the "active" mode, as shown in block 818. The steps as illustrated in FIG. 8 may be performed in various orders, and the method of FIG. 8 is meant to be illustrative, only.

Figure 9:
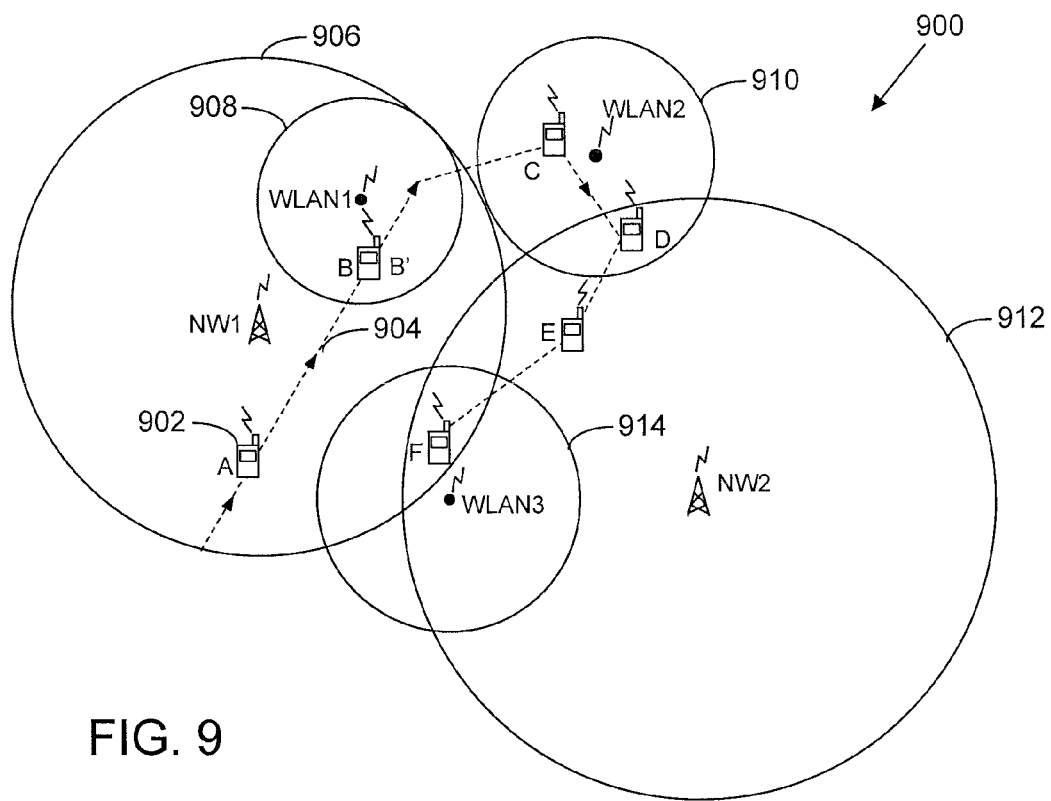
FIG. 9 illustrates the travel path of a wireless communication device traveling through network coverage areas and wireless local area network coverage areas.
Figure 11:
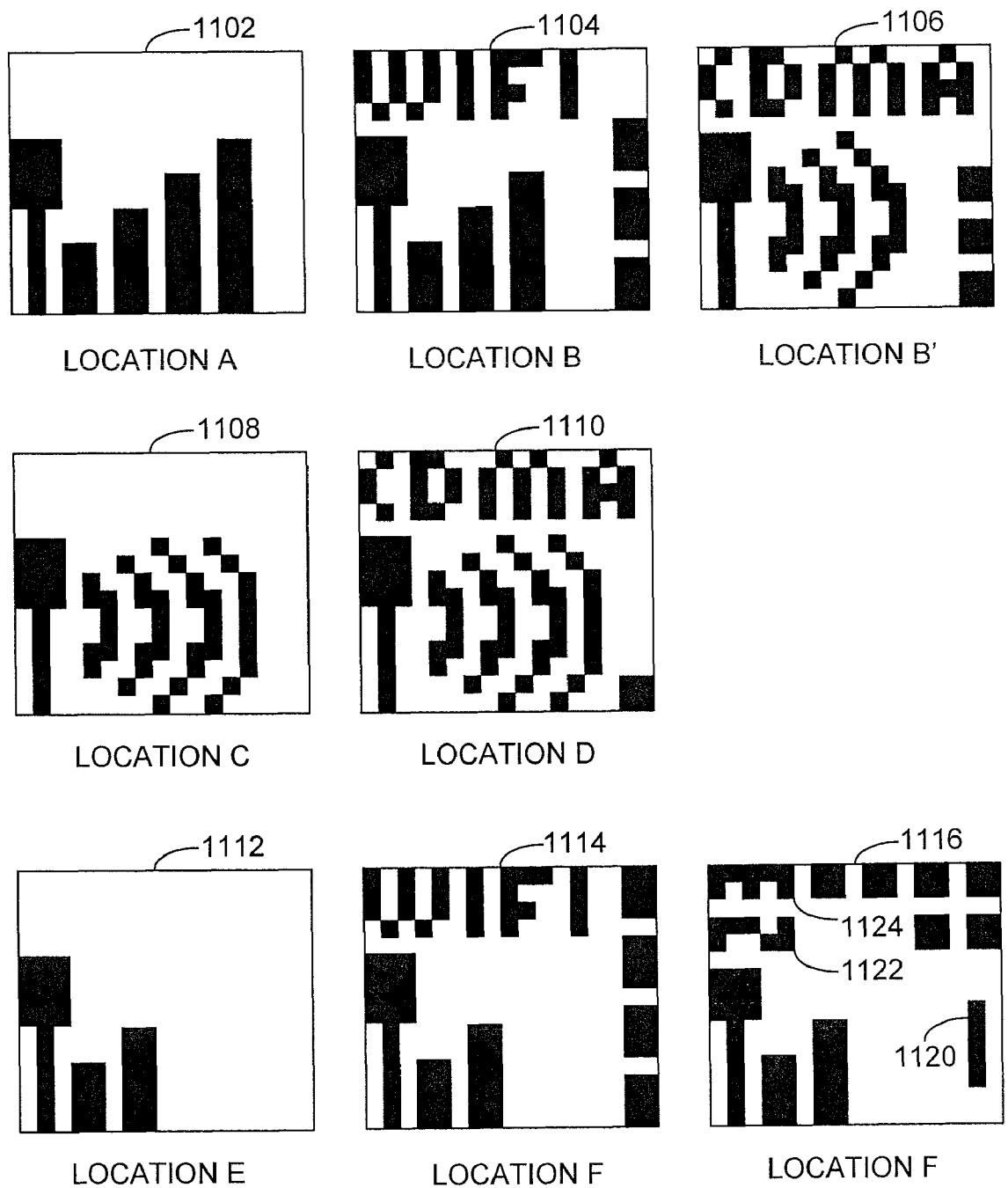
FIG. 11 illustrates example annunciator areas for the wireless communication device travel path of FIG. 9 according to one embodiment of the invention.

FIG. 9 illustrates an example travel path of a multi-mode wireless communication device 902 traveling through network coverage areas 906, 912 and wireless local area network coverage areas 908, 910, 914. Example annunciator areas for the wireless communication device travel path 904 of FIG. 9 are shown in FIG. 11, according to one embodiment of the invention. At location A, wireless device 902 is within coverage area 906 of network 1, NW1. Annunciator area at location A 1102 displays, for example, a CDMA active mode having a maximal signal strength. At location B, wireless device 902 is within coverage area 908 of a first wireless local area network, WLAN1. Annunciator area at location B 1104 displays the CDMA active mode as well as the available WIFI mode. At location B, the CDMA active mode and the WIFI mode both have sufficient signals strengths. At location B', the user switches to the WIFI mode. The annunciator area at location B' 1106 indicates that WIFI is now the active mode, with CDMA available as an alternate second mode.

Continuing with FIGS. 9 and 11, at location C, wireless device 902 is within coverage area 910 of WLAN2. Annunciator area at location C 1108 shows the active mode signal strength only since an alternate network is not available. Annunciator area at location D 1110 displays the available CDMA network, however, as the wireless device 902 is at an edge of the coverage area 912 of CDMA network NW2, the signal strength is weak as indicated by the single signal strength bar. At location E, the device 902 is not within a WLAN coverage area, and annunciator area at location E 1112 displays the current active CDMA mode.

At location F, the wireless device 902 is within coverage areas 906, 914, and 912. The current mode is maintained in annunciator area at location F 1114. Annunciator area at location F also indicates that WIFI is available as an alternate network with a maximal signal strength. In the illustrated embodiment, only two networks are displayed in the annunciator. In an alternate embodiment, as shown in annunciator area at location F 1116, all of the available networks and the corresponding signal strengths are displayed. In the illustrated example, the active mode CDMA network NW2 is identified as "1" and has two signal strength bars, an alternate CDMA network NW1 is identified as "2" and also has two signal strength bars. Another alternate local area network WLAN3 is identified as "3" and has four signal strength bars. As discussed above, the number of available networks displayed may vary in other embodiments of the invention.

Figure 10:
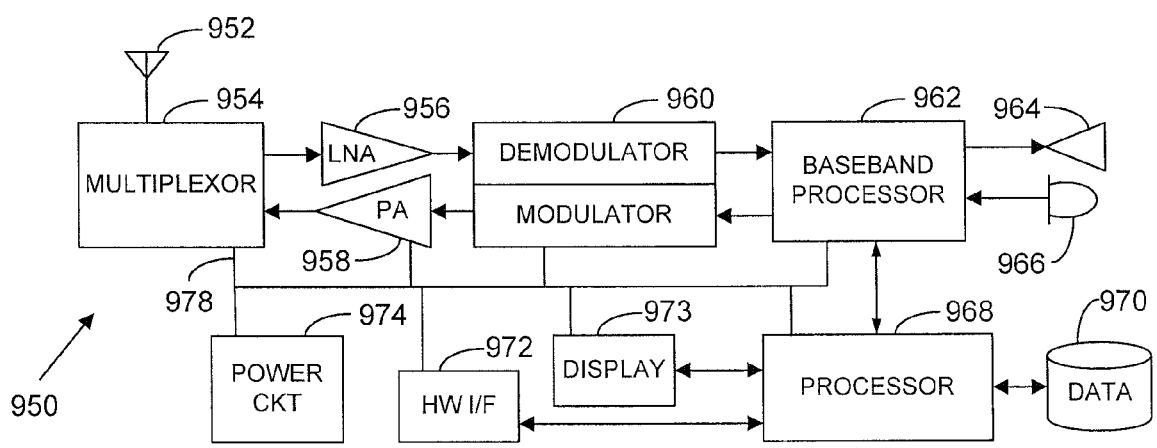
FIG. 10 is a block diagram illustrating an exemplary wireless communication device that may be used in connection with the various embodiments described herein.

FIG. 10 is a block diagram illustrating an exemplary multi-mode wireless communications device 950 that may be used in connection with the various embodiments for displaying signal strength described herein. However, other wireless communications devices and/or architectures may also be used, as will be clear to those skilled in the art. In the illustrated embodiment, wireless communication device 950 comprises an antenna 952, a multiplexor 954, a low noise amplifier ("LNA") 956, a power amplifier ("PA") 958, a modulation circuit 960, a baseband processor 962, a speaker 964, a microphone 966, a processor 968, a data storage area 970, a display 973, a hardware interface 372, and a power circuit 374 coupled to the various circuit elements. Various user interface devices (not shown), such as keypads and additional display devices, may be communicably couple to hardware interface 972 or processor 968 for receiving user input and communicating output messages. In the wireless communications device 950, radio frequency ("RF") signals are transmitted and received by antenna 952. Elements 954, 956, 958, and 960 may be collectively referred to as a transceiver.

Multiplexor 954 acts as a switch, coupling antenna 952 between the transmit and receive signal paths. In the receive path, received RF signals are coupled from a multiplexor 954 to LNA 956. LNA 956 amplifies the received RF signal and couples the amplified signal to a demodulation portion of the modulation circuit 960. The demodulator strips away the RF carrier signal leaving a base-band receive signal, which is sent from the demodulator output to the base-band processor 962.

If the base-band receive audio signal contains audio information, then base-band processor 962 decodes the signal and converts it to an analog signal. Then the signal is amplified and sent to the speaker 964. The base-band processor 962 also receives analog audio signals from the microphone 966. These analog audio signals are converted to digital signals and encoded by the base-band processor 962. The base-band processor 962 also codes the digital signals for transmission and generates a base-band transmit audio signal that is routed to the modulator portion of modulation circuit 960. The modulator mixes the base-band transmit audio signal with an RF carrier signal generating an RF transmit signal that is routed to the power amplifier 958. The power amplifier 958 amplifies the RF transmit signal and routes it to the multiplexor 954 where the signal is switched to the antenna port for transmission by antenna 952.

The baseband processor 962 is also communicatively coupled with the processor 968. The processor 968 has access to a data storage area 970. The processor 968 is preferably configured to execute instructions embodied in software such as method 800 of FIG. 8 that can be stored in the data storage area 970.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, the specific steps of the method could be modified from that discussed above without departing from the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for indicating signal strength of a multi-mode wireless communications device, the method comprising the steps of:
    detecting a first signal strength of a first wireless technology on the multi-mode wireless communication device;
    detecting a second signal strength of a second wireless technology on the multimode wireless communication device, wherein the step of detecting the second signal strength of the second wireless technology further comprises conducting a user-controlled periodic search for the second wireless technology;
    periodically searching for at least one alternate signal strength of an alternate wireless technology;
    displaying a single annunciator signal strength display that includes a first signal strength display area adjacent to a second signal strength display area, wherein the first signal strength display area indicates an active mode signal and the second signal strength display area indicates an inactive mode signal;
    displaying a first signal strength indicator in the first signal strength display area on the multi-mode wireless communication device, the first signal strength indicator corresponding to the detected first signal strength of the first wireless technology when the first wireless technology provides the active mode signal;
    simultaneously displaying a second signal strength indicator in the second signal strength display area on the multi-mode wireless communication device if the second wireless technology is detected, the second signal strength indicator corresponding to the detected second signal strength of the second wireless technology when the second wireless technology provides the inactive mode signal;
    simultaneously displaying the at least one alternate signal strength indicator on the multi-mode wireless communication device if the at least one alternate wireless technology is detected in the periodic search, the at least one alternate signal strength indicator corresponding to the detected at least one signal strength of the alternate wireless technology;
    switching the inactive mode from a first active mode having a first active mode signal strength to a next active mode having a next active mode signal strength; and
    displaying a next active mode signal strength indicator corresponding to the next active mode signal strength.

2. The method of claim 1, wherein the first wireless technology is an active mode of the multi-mode wireless communications device.

3. The method of claim 1, wherein at least one of the first wireless technology and the second wireless technology is Code Division Multiple Access (CDMA).

4. The method of claim 1, wherein at least one of the first wireless technology and the second wireless technology is a wireless local area network (WLAN).

5. The method of claim 1, wherein at least one of the first wireless technology and the second wireless technology is wireless fidelity (WIFI).

6. The method of claim 1, wherein at least one of the first signal strength indicator and the second signal strength indicator is at least one bar of a plurality of signal strength graduated bars.

7. The method of claim 1, wherein at least one of the first signal strength indicator and the second signal strength indicator is at least one bar of a plurality of same-sized bars, wherein a number of bars of the plurality of same-sized bars is indicative of the signal strength.

8. The method of claim 1, further comprising the step of:
    displaying a text description of at least one of the first wireless technology and the second wireless technology on the multi-mode wireless communication device.

9. A method for displaying signal strength indicators on a multi-mode wireless device, the method comprising the steps of:
    displaying a single annunciator signal strength display that includes a first signal strength display area adjacent to a second signal strength display area and an alternate signal strength display area, wherein the first signal strength display area indicates an active mode signal, the second signal strength display area indicates an inactive mode signal, and the alternate signal strength display area indicates at least one alternate inactive mode signal;
    detecting the active mode signal strength of a first wireless technology on the multi-mode wireless device;
    displaying a first signal strength indicator in the first signal strength display area, the first signal strength indicator corresponding to the detected active mode signal strength; and
    detecting a second signal strength of a second wireless technology on the multimode wireless device, wherein the step of detecting the second signal strength of the second wireless technology further comprises conducting a user-controlled periodic search for the second wireless technology;
    periodically searching for at least one alternate signal strength of an alternate wireless technology;
    simultaneously displaying a second signal strength indicator in the second signal strength display area when the second wireless technology provides the inactive mode signal, the second signal strength indicator corresponding to the detected second signal strength of the second wireless technology;
    simultaneously displaying the at least one alternate signal strength indicator on the multi-mode wireless communication device if the at least one alternate wireless technology is detected in the periodic search, the at least one alternate signal strength indicator corresponding to the detected at least one signal strength of the alternate wireless technology;

switching the inactive mode from a first active mode having a first active mode signal strength to a next active mode having a next active mode signal strength; and displaying a next active mode signal strength indicator corresponding to the next active mode signal strength.

10. The method of claim 9, wherein at least one of the first wireless technology and the second wireless technology is Code Division Multiple Access (CDMA), and the other of the first wireless technology and the second wireless technology is a wireless local area network (WLAN).

11. A multi-mode wireless device comprising:

a signal strength detector for detecting a first signal strength of a first wireless technology and for detecting a second signal strength of a second wireless technology and for detecting at least one alternate signal strength of an alternate wireless technology, wherein the detector performs a user-controlled periodic search for the second wireless technology and performs a periodic search for at least one alternate wireless technology;

a processor connected to the signal strength detector, the processor for selecting one of the first wireless technology, the second wireless technology, and the at least one alternate wireless technology as an active mode, and for selecting the other of the first wireless technology, the second wireless technology, and the at least one alternate wireless technology, if the at least one alternate wireless technology is detected in the periodic search, as alternate modes;

a display connected to the processor, the display comprising:

a single annunciator signal strength display that includes an active display area adjacent to an alternate display area;

the active mode display area for displaying an active mode indicator corresponding to an active mode signal strength of the selected active mode; and the alternate mode display area for simultaneously displaying alternate mode indicators corresponding to alternate mode signal strengths of the alternate modes;

a user interface for selecting an alternate mode;

the processor for switching the alternate mode from a first active mode having a first active mode signal strength to a next active mode having a next active mode signal strength; and displaying a next active mode signal strength indicator corresponding to the next active mode signal strength.

12. The device of claim 11, wherein at least one of the first wireless technology and the second wireless technology is Code Division Multiple Access (CDMA), and the other of the first wireless technology and the second wireless technology is a wireless local area network (WLAN).

13. The device of claim 11, wherein the active mode indicator and the alternate mode indicator are visually distinguishable bar-type indicators.

14. The device of claim 11, wherein at least one of the active mode indicator and the alternate mode indicator is at least one bar of a plurality of same-sized bars, wherein a number of bars of the plurality of same-sized bars is indicative of the signal strength.

15. The device of claim 11, wherein the display further comprises:

a text description of at least one of the first wireless technology and the second wireless technology displayed in the alternate mode area.

* * * * *